US012618982B2

(12) United States Patent
Kuismanen

(10) Patent No.: US 12,618,982 B2
(45) Date of Patent: May 5, 2026

(54) ERROR CHARACTERIZATION FOR GNSS-BASED POSITION ESTIMATES ON CONSTRAINED ROUTES

(71) Applicant: HERE Global B.V., Eindhoven (NL)

(72) Inventor: Saara Kuismanen, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 471 days.

(21) Appl. No.: 17/818,804

(22) Filed: Aug. 10, 2022

(65) Prior Publication Data

US 2024/0053491 A1 Feb. 15, 2024

(51) Int. Cl.
| | |
|---|---|
| *G01S 19/40* | (2010.01) |
| *G01S 19/46* | (2010.01) |
| *G01S 19/47* | (2010.01) |
| G01S 19/07 | (2010.01) |
| G01S 19/13 | (2010.01) |
| G01S 19/50 | (2010.01) |

(52) U.S. Cl.
CPC .............. *G01S 19/40* (2013.01); *G01S 19/46* (2013.01); *G01S 19/47* (2013.01); *G01S 19/07* (2013.01); *G01S 19/13* (2013.01); *G01S 19/50* (2013.01)

(58) Field of Classification Search
CPC .......... G01S 19/40; G01S 19/07; G01S 19/13; G01S 19/46; G01S 19/47; G01S 19/50
USPC ............ 342/357.23, 357.44, 357.51, 357.29, 342/357.3, 357.33
See application file for complete search history.

(56) References Cited

U.S. PATENT DOCUMENTS

| | | | |
|---|---|---|---|
| 5,913,170 A | 6/1999 | Wortham | |
| 7,746,271 B2 | 6/2010 | Furstenberg | |
| 8,442,760 B2 * | 5/2013 | Watanabe | G01S 19/34 |
| | | | 701/431 |
| 8,947,298 B2 | 2/2015 | Yamamoto et al. | |
| 9,945,100 B2 * | 4/2018 | Friend | E02F 9/2054 |

(Continued)

FOREIGN PATENT DOCUMENTS

| | | | | |
|---|---|---|---|---|
| BR | 9910229 B1 * | 1/2014 | | G01S 19/50 |
| EP | 3693702 A1 * | 8/2020 | | G01C 21/30 |
| GB | 2585191 A * | 1/2021 | | G01C 21/165 |

OTHER PUBLICATIONS

Bhyiyan et al., "Advanced Multipath Mitigation Techniques for Satellite-Based Positioning Applications", International Journal of Navigation and Observation, vol. 2010, Article ID 412393, (Oct. 20, 2010), 16 pages.

(Continued)

*Primary Examiner* — Chuong P Nguyen
(74) *Attorney, Agent, or Firm* — Michael Yu; HERE GLOBAL B.V.

(57) ABSTRACT

One or more processors obtain GNSS receiver data captured during a time period by a GNSS receiver disposed onboard a constrained vehicle traversing a constrained route. The processor(s) determine a GNSS-based position estimate based on the GNSS receiver data. The position estimate indicates an estimated location of the GNSS receiver during at least a portion of the time period. The processor(s) determine an error characterization corresponding to an offset between the position estimate and an expected location of the GNSS receiver along the constrained route. The processor(s) cause a mobile device to perform a positioning or navigation-related function that accounts for the error characterization.

16 Claims, 8 Drawing Sheets

(56) References Cited

U.S. PATENT DOCUMENTS

| | | | | |
|---|---|---|---|---|
| 10,809,388 | B1 * | 10/2020 | Carcanague | G01S 19/49 |
| 10,866,326 | B2 * | 12/2020 | Matsue | G01S 19/40 |
| 11,402,514 | B2 * | 8/2022 | Sun | G01S 19/40 |
| 11,668,842 | B2 * | 6/2023 | Ewert | G01S 19/42 |
| | | | | 342/357.25 |
| 12,072,425 | B2 * | 8/2024 | Knoedler | G01S 19/42 |
| 2009/0140924 | A1 * | 6/2009 | Mizuochi | G01S 19/48 |
| | | | | 342/357.31 |
| 2012/0232792 | A1 * | 9/2012 | Ding | G01S 19/49 |
| | | | | 701/472 |
| 2013/0147661 | A1 | 6/2013 | Kangas et al. | |
| 2014/0087754 | A1 | 3/2014 | Siomina et al. | |
| 2019/0094386 | A1 * | 3/2019 | Matsue | G01S 19/47 |
| 2020/0233095 | A1 * | 7/2020 | Adachi | G01S 19/45 |
| 2021/0003403 | A1 * | 1/2021 | Wheeler | G06F 16/29 |
| 2022/0373695 | A1 * | 11/2022 | Rautalin | G01S 19/07 |
| 2023/0258826 | A1 * | 8/2023 | Kitano | G01S 19/49 |
| | | | | 701/408 |
| 2024/0019265 | A1 * | 1/2024 | Kuismanen | H04W 4/40 |
| 2024/0272309 | A1 * | 8/2024 | Peng | G01S 19/43 |

OTHER PUBLICATIONS

Gabela et al., "Experimental Evaluation of a UWB-Based Cooperative Positioning System for Pedestrians in GNSS-Denied Environment", Sensors 2019, 19, 5274, (Nov. 29, 2019), 25 pages.

Garello et al., "Peer-to-Peer Cooperative Positioning, Part 1: GNSS-Aided Acquisition", Retrieved via the Internet <URL:https://www.insidegnss.com/auto/marapr12-WP.pdf>, (Apr. 2012), 9 pages.

Garello et al., "Peer-to-Peer Cooperative Positioning, Part 2: Hybrid Devices with GNSS & Terrestrial Ranging Capability", Retrieved via the Internet <URL:https://www.insidegnss.com/auto/julyaug12-WP.pdf>, (Aug. 2012), 9 pages.

Hsu, "GNSS multipath detection using a machine learning approach," 2017 IEEE 20th International Conference on Intelligent Transportation Systems (ITSC), (Mar. 15, 2018), 6 pages.

Van Diggelen, F., "Google to Improve Urban GPS Accuracy for Apps", Retrieved via the Internet: <URL:https://www.gpsworld.com/google-to-improve-urban-gps-accuracy-for-apps/>, (Dec. 9, 2020), 8 pages.

Zhang et al., "Rectification of GNSS-based collaborative positioning using 3D building models in urban areas", GPS Solutions (2019) 23:83, (Jun. 6, 2019), 12 pages.

* cited by examiner

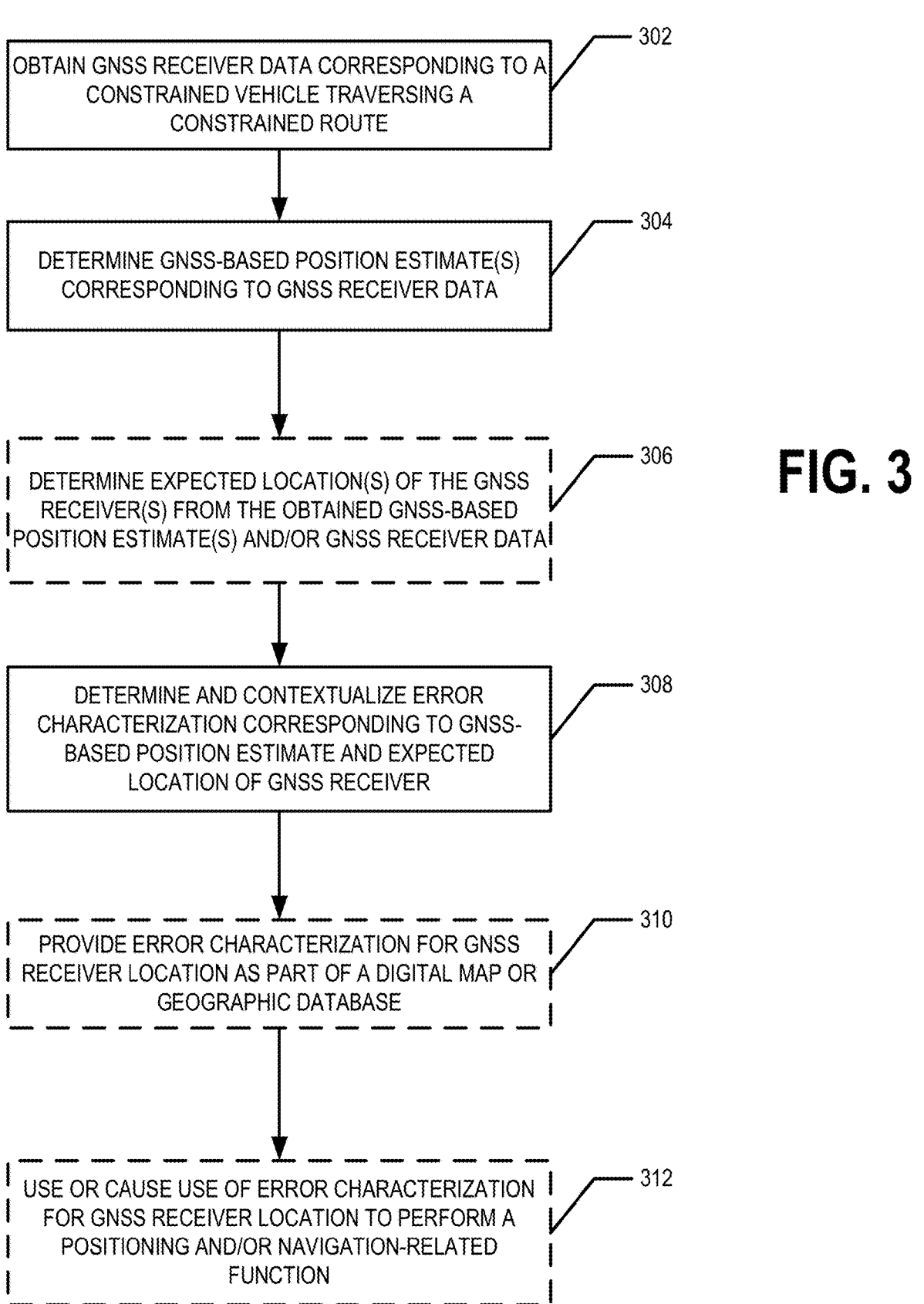

302 — OBTAIN GNSS RECEIVER DATA CORRESPONDING TO A CONSTRAINED VEHICLE TRAVERSING A CONSTRAINED ROUTE

304 — DETERMINE GNSS-BASED POSITION ESTIMATE(S) CORRESPONDING TO GNSS RECEIVER DATA

306 — DETERMINE EXPECTED LOCATION(S) OF THE GNSS RECEIVER(S) FROM THE OBTAINED GNSS-BASED POSITION ESTIMATE(S) AND/OR GNSS RECEIVER DATA

308 — DETERMINE AND CONTEXTUALIZE ERROR CHARACTERIZATION CORRESPONDING TO GNSS-BASED POSITION ESTIMATE AND EXPECTED LOCATION OF GNSS RECEIVER

310 — PROVIDE ERROR CHARACTERIZATION FOR GNSS RECEIVER LOCATION AS PART OF A DIGITAL MAP OR GEOGRAPHIC DATABASE

312 — USE OR CAUSE USE OF ERROR CHARACTERIZATION FOR GNSS RECEIVER LOCATION TO PERFORM A POSITIONING AND/OR NAVIGATION-RELATED FUNCTION

FIG. 3

CAPTURE GNSS RECEIVER DATA — 402

CAPTURE SENSOR DATA — 404

DETERMINE EXPECTED LOCATION BASED ON SENSOR DATA — 406

PROVIDE GNSS RECEIVER DATA (AND EXPECTED LOCATION) — 408

502

PROVIDE ERROR CHARACTERIZATION REQUEST

504

RECEIVE ROUTING INFORMATION INCLUDING ERROR CHARACTERIZATION FOR AT LEAST ONE TIME

506

USE ERROR CHARACTERIZATION TO PERFORM POSITIONING OR NAVIGATION-RELATED FUNCTION

ERROR CHARACTERIZATION FOR GNSS-BASED POSITION ESTIMATES ON CONSTRAINED ROUTES

TECHNOLOGICAL FIELD

An example embodiment relates generally to positioning error characterization. In particular, an example embodiment generally relates to a positioning error characterization of position estimates corresponding to a location of a constrained vehicle on a constrained route.

BACKGROUND

Global Navigation Satellite Systems (GNSS) are generally directed to positioning and navigation solutions. It is estimated that the total number of GNSS receivers in the market exceeded 6 billion units by the end of 2018, and a GNSS receiver can be found in nearly every smartphone, smartwatch, new car, high-end drone, etc. The volume of GNSS receivers in apparatuses is still rapidly growing due to the GNSS integration into the Internet of Things (IoT) devices. However, in various scenarios, the position accuracy may be only 5-10 meters.

BRIEF SUMMARY

Various embodiments provide methods, apparatuses, systems, computer program products, and/or the like for determining and providing positioning error characterization and/or using positioning error characterization to perform one or more navigation-related functions that account for the error characterization. In various embodiments, GNSS receiver data is used to determine a position estimate that estimates the location of a constrained vehicle (e.g., a vehicle configured to traverse a constrained route) and to determine an error characterization of the positioning estimate based at least in part on the constrained vehicle being located on the constrained route. In an example embodiment, the error characterization comprises an offset (e.g., a scalar or vector description of the distance) between the position estimate estimating the location of the constrained vehicle and an expected location of the GNSS receiver onboard the constrained vehicle on the constrained route. The error characterization may then be used to cause a mobile device to perform a positioning or navigation-related function that accounts for the error characterization. According to an aspect of the present disclosure, a method is provided for performing error characterization aware navigation. The method comprises obtaining, by one or more processors (e.g., of a constrained apparatus, a network apparatus, and/or a mobile apparatus), GNSS receiver data captured during a time period. The GNSS receiver is disposed onboard a constrained vehicle that is configured to traverse a constrained route. The method further comprises determining, by the one or more processors a GNSS-based position, an estimated location of the GNSS receiver during at least a portion of the time period based at least in part on the GNSS receiver data. The method further comprises determining, by the one or more processors, an error characterization corresponding to an offset between the position estimate and an expected location of the GNSS receiver along the constrained route. The method further comprises causing, by the one or more processors, a mobile device to perform a positioning or navigation-related function that accounts for the error characterization.

In an example embodiment, the error characterization comprising the offset between the position estimate and the expected location of the GNSS receiver further comprises the expected location from the constrained route.

In an example embodiment, the error characterization comprising the offset between the position estimate and the expected location of the GNSS receiver further comprises a multi-dimensional displacement between the position estimate and the expected location of the GNSS receiver disposed aboard the constrained vehicle along the constrained route during the time period.

In an example embodiment, the expected location of the GNSS receiver disposed aboard the constrained vehicle along the constrained route during the time period is determined based at least in part on at least one of (a) an Inertial Measurement Unit (IMU) or (b) observations captured by a radio interface coupled to the constrained vehicle.

In an example embodiment, the error characterization comprises an error estimate for each GNSS satellite observed by the GNSS receiver.

In an example embodiment, the mobile device performs a positioning or navigation-related function that accounts for the error characterization comprises at least one of (a) broadcasting the error characterization, (b) providing the error characterization in response to a received request, or (c) incorporating or causing the incorporating of the error characterization into a digital map or geographic database.

In an example embodiment, the mobile device performs the positioning or navigation-related function that accounts for the error characterization by at least one of (a) correcting a GNSS-based mobile device position estimate based on the error characterization, (b) correcting one or more observed GNSS signals based on the error characterization, or (c) determining a position of the mobile device using a non-GNSS-based positioning technique.

In an example embodiment, the error characterization comprises at least one of a velocity error estimate or a heading error estimate.

In an example embodiment, the constrained route is constrained by one of (a) rails along which the constrained vehicle travels or (b) dedicated travel lanes along which the constrained vehicle travels.

In an example embodiment, a plurality of ground truth positions of one or more points along the constrained route are known and the error characterization is determined based at least in part on at least one of the ground truth positions.

According to another aspect, an apparatus (e.g., a constrained apparatus, network apparatus, and/or mobile apparatus) is provided. In an example embodiment, the apparatus comprises one or more processor and a memory storing computer-executable instructions. The computer-executable instructions are configured to, when executed by the one or more processors, cause the apparatus to at least obtain, by one or more processors, GNSS receiver data captured during a time period by a GNSS receiver disposed onboard a constrained vehicle. The constrained vehicle is configured to traverse a constrained route. The apparatus comprises determining, by one or more processors, a GNSS-based position estimate indicating an estimated location of the GNSS receiver during at least a portion of the time period. The GNSS-based position estimate is determined based at least in part on the GNSS receiver data. The apparatus further comprises determining, by the one or more processors, an error characterization corresponding to an offset between the position estimate and an expected location of the GNSS receiver along the constrained route. The apparatus further comprising causing, by one or more processors, a mobile device to perform a positioning or navigation-related function that accounts for the error characterization.

In an example embodiment, the error characterization comprising the offset between the position estimate and the expected location of the GNSS receiver further comprises the expected location from the constrained route.

In an example embodiment, the error characterization comprising the offset between the position estimate and the expected location of the GNSS receiver further comprises a multi-dimensional displacement between the position estimate and the expected location of the GNSS receiver disposed aboard the constrained vehicle along the constrained route during the time period.

In an example embodiment, the expected location of the GNSS receiver disposed aboard the constrained vehicle along the constrained route during the time period is determined based at least in part on at least one of (a) an IMU or (b) observations captured by a radio interface coupled to the constrained vehicle.

In an example embodiment, the error characterization comprises an error estimate for each GNSS satellite observed by the GNSS receiver.

In an example embodiment, the mobile device performs a positioning or navigation-related function that accounts for the error characterization comprises at least one of (a) broadcasting the error characterization, (b) providing the error characterization in response to a received request, or (c) incorporating or causing the incorporating of the error characterization into a digital map or geographic database.

In an example embodiment, the mobile device performs the positioning or navigation-related function that accounts for the error characterization by at least one of (a) correcting a GNSS-based mobile device position estimate based on the error characterization, (b) correcting one or more observed GNSS signals based on the error characterization, or (c) determining a position of the mobile device using a non-GNSS-based positioning technique.

In an example embodiment, the error characterization comprises at least one of a velocity error estimate or a heading error estimate.

In an example embodiment, the constrained route is constrained by one of (a) rails along which the constrained vehicle travels or (b) dedicated travel lanes along which the constrained vehicle travels.

In an example embodiment, a plurality of ground truth positions of one or more points along the constrained route are known and the error characterization is determined based at least in part on at least one of the ground truth positions.

According to another aspect, a computer program product is provided. In an example embodiment, the computer program product comprises a non-transitory computer-readable medium storing computer-executable instructions. The computer-executable instructions are configured, when executed by a processor of an apparatus (e.g., a constrained apparatus, network apparatus, and/or mobile apparatus) to cause the computer program product to obtain, by the one or more processors, GNSS receiver data captured during a time period by a GNSS receiver disposed onboard a constrained vehicle. The constrained vehicle is configured to traverse a constrained route. The computer program product comprises determining, by the one or more processors, a GNSS-based position estimate indicating an estimated location of the GNSS receiver during at least a portion of the time period. The GNSS-based position estimate is determined based at least in part on the GNSS receiver data. The computer program product comprises determining, by the one or more processors, an error characterization corresponding to an offset between the position estimate and an expected location of the GNSS receiver along the constrained route. The computer program product comprises causing, by one or more processors, a mobile device to perform a positioning or navigation-related function that accounts for the error characterization.

In an example embodiment, the error characterization comprising the offset between the position estimate and the expected location of the GNSS receiver further comprises the expected location from the constrained route.

In an example embodiment, the error characterization comprising the offset between the position estimate and the expected location of the GNSS receiver further comprises a multi-dimensional displacement between the position estimate and the expected location of the GNSS receiver disposed aboard the constrained vehicle along the constrained route during the time period.

In an example embodiment, the expected location of the GNSS receiver disposed aboard the constrained vehicle along the constrained route during the time period is determined based at least in part on at least one of (a) an IMU or (b) observations captured by a radio interface coupled to the constrained vehicle.

In an example embodiment, the error characterization comprises an error estimate for each GNSS satellite observed by the GNSS receiver.

In an example embodiment, the mobile device performs a positioning or navigation-related function that accounts for the error characterization comprises at least one of (a) broadcasting the error characterization, (b) providing the error characterization in response to a received request, or (c) incorporating or causing the incorporating of the error characterization into a digital map or geographic database.

In an example embodiment, the mobile device performs the positioning or navigation-related function that accounts for the error characterization by at least one of (a) correcting a GNSS-based mobile device position estimate based on the error characterization, (b) correcting one or more observed GNSS signals based on the error characterization, or (c) determining a position of the mobile device using a non-GNSS-based positioning technique.

In an example embodiment, the error characterization comprises at least one of a velocity error estimate or a heading error estimate.

In an example embodiment, the constrained route is constrained by one of (a) rails along which the constrained vehicle travels or (b) dedicated travel lanes along which the constrained vehicle travels.

In an example embodiment, a plurality of ground truth positions of one or more points along the constrained route are known and the error characterization is determined based at least in part on at least one of the ground truth positions.

According to yet another aspect, an apparatus (e.g., a constrained apparatus, a network apparatus, and/or a mobile apparatus) is provided. In an example embodiment, the apparatus comprises means for obtaining GNSS receiver data captured during a time period. The GNSS receiver is disposed onboard a constrained vehicle that is configured to traverse a constrained route. The apparatus comprises means for determining a GNSS-based position indicating an estimated location of the GNSS receiver during at least a portion of the time period based at least in part on the GNSS receiver data. The apparatus comprises means for determining an error characterization corresponding to an offset between the position estimate and an expected location of the GNSS receiver along the constrained route. The apparatus comprises means for causing a mobile device to perform a positioning or navigation-related function that accounts for the error characterization.

BRIEF DESCRIPTION OF THE DRAWINGS

Figure 1:
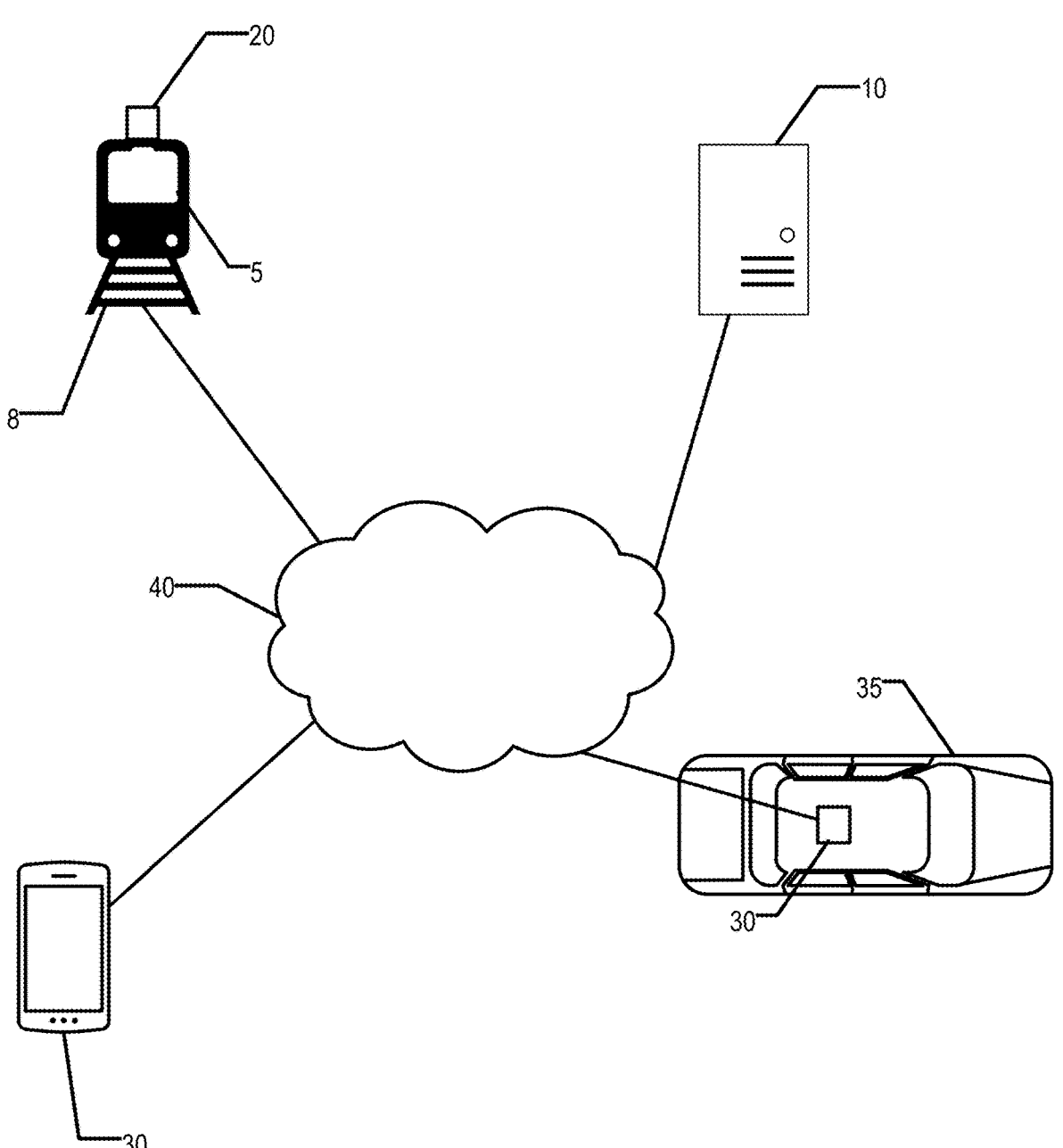
Figure 2A:
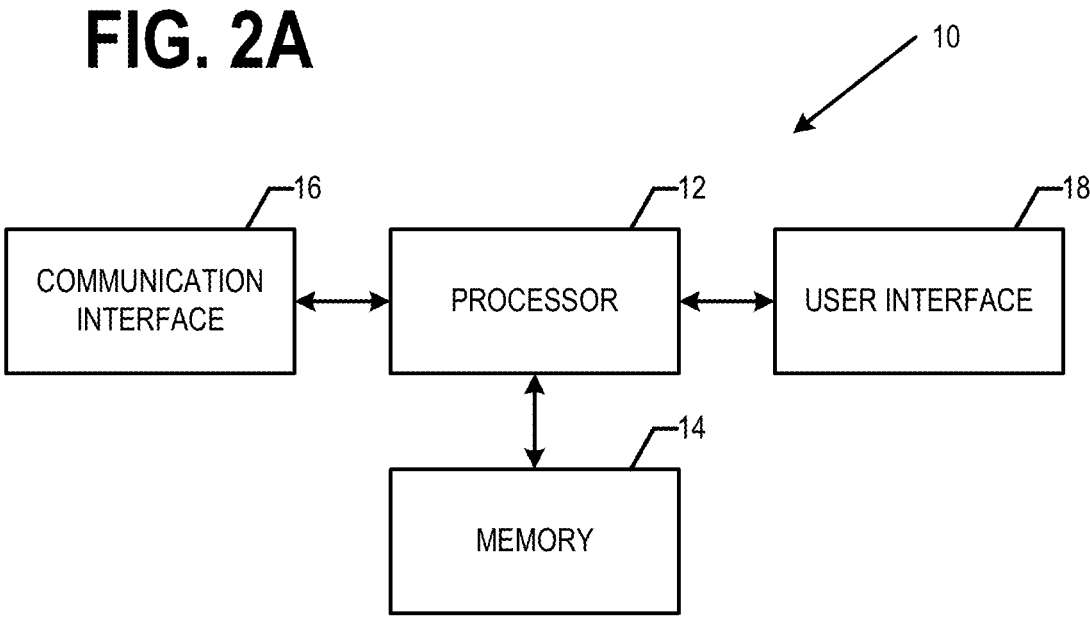
Figure 2B:
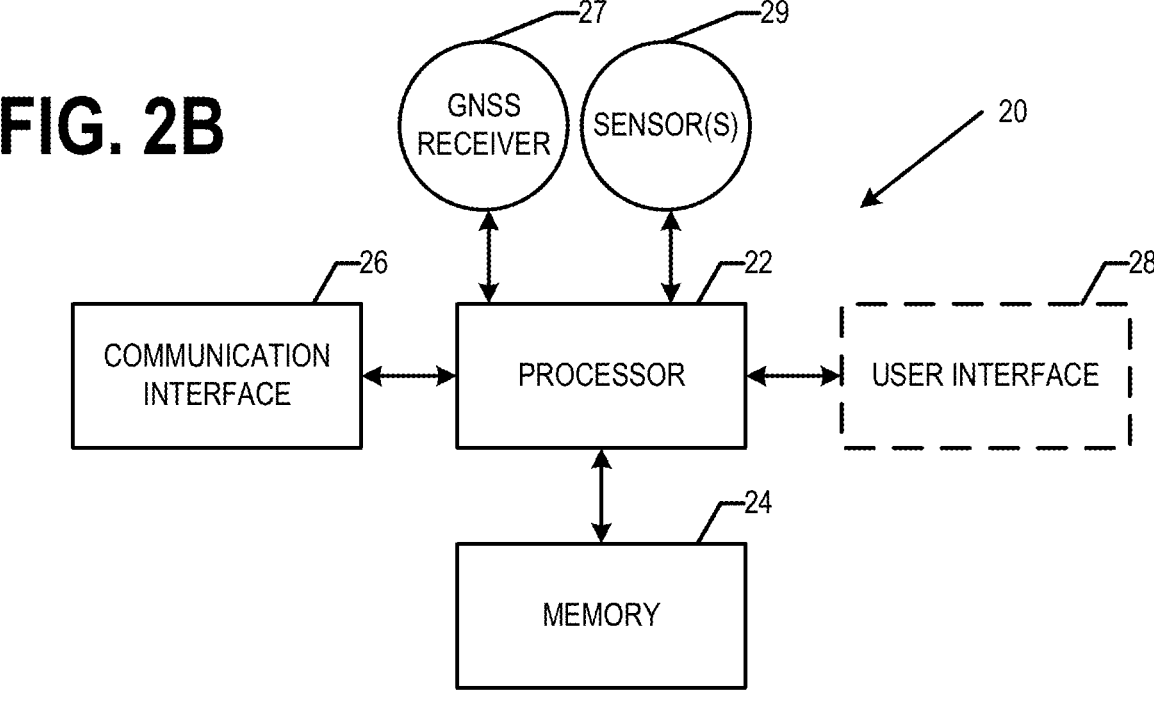
Figure 2C:
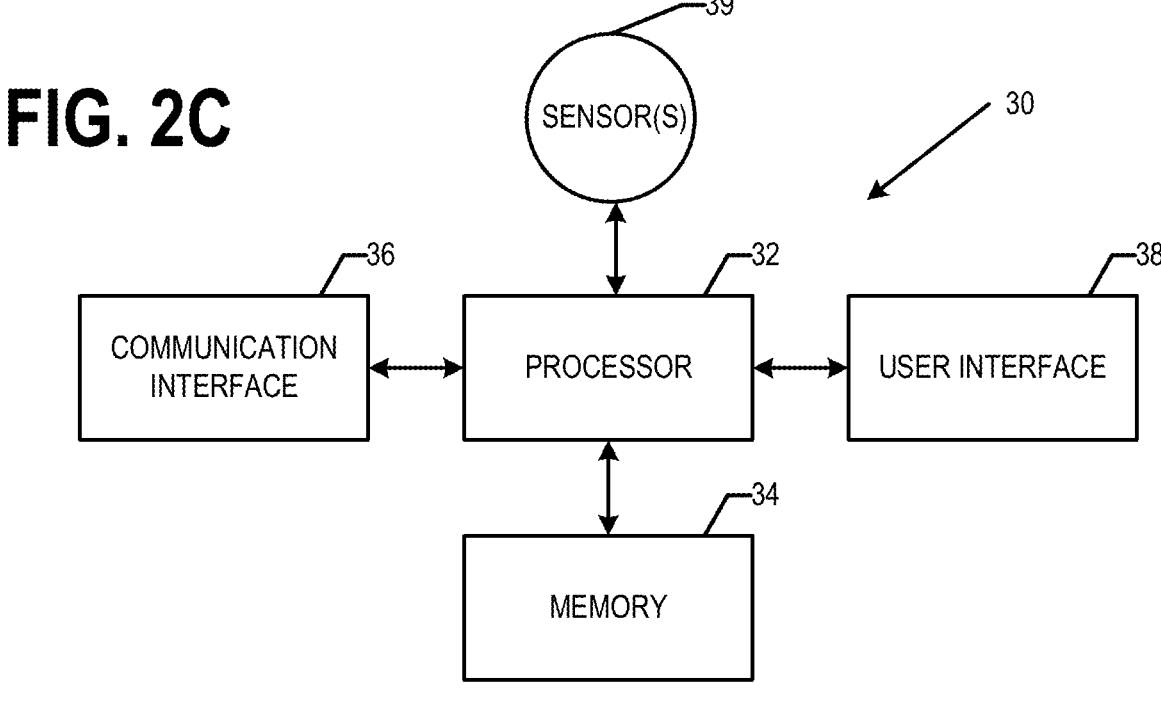
Figure 4:
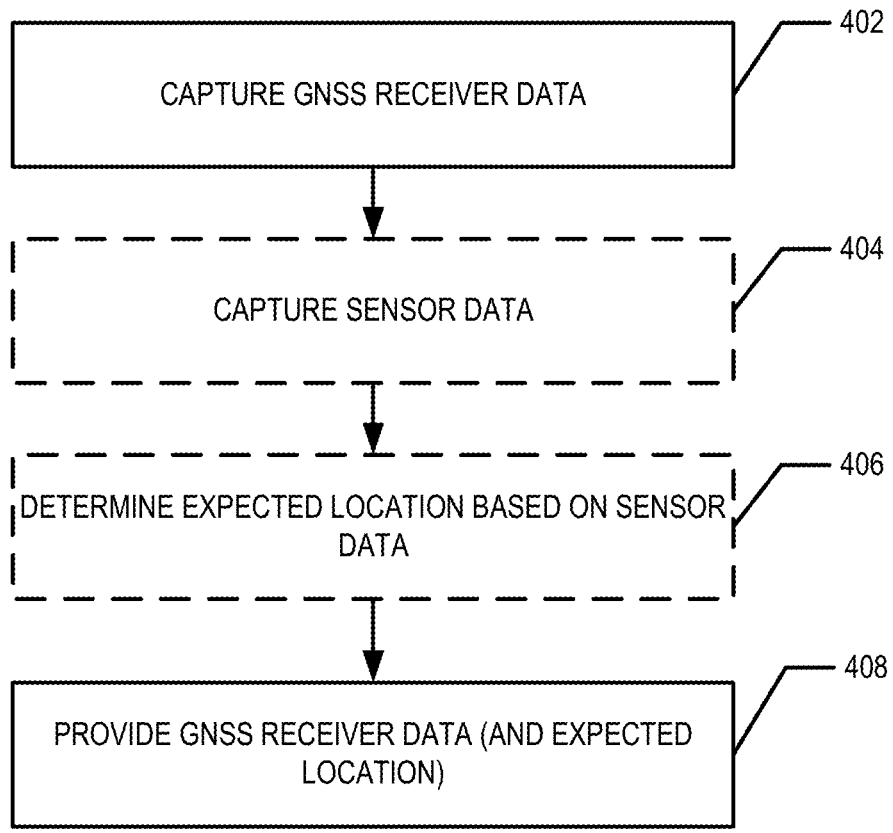
Figure 5:
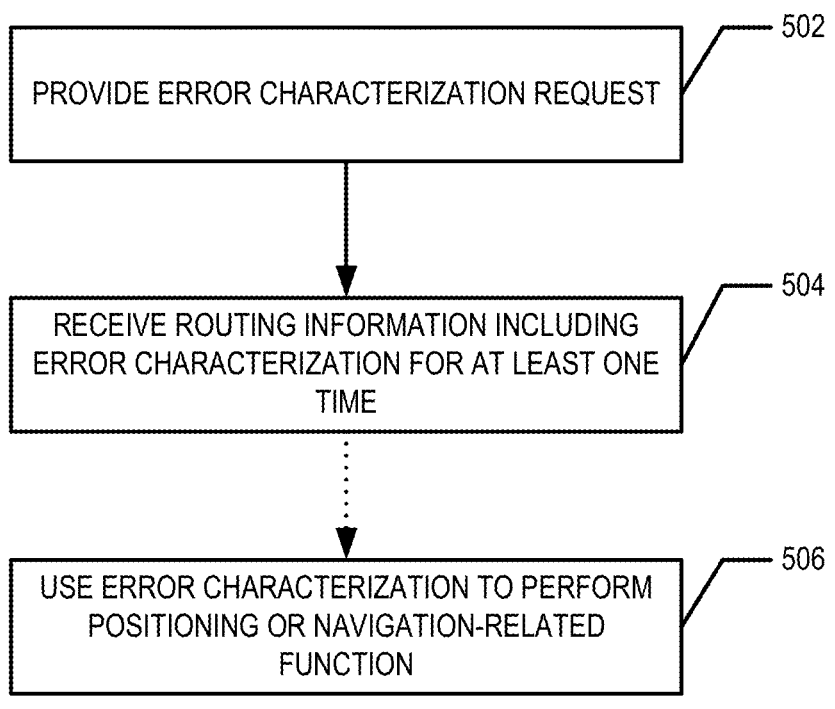
Figure 6:
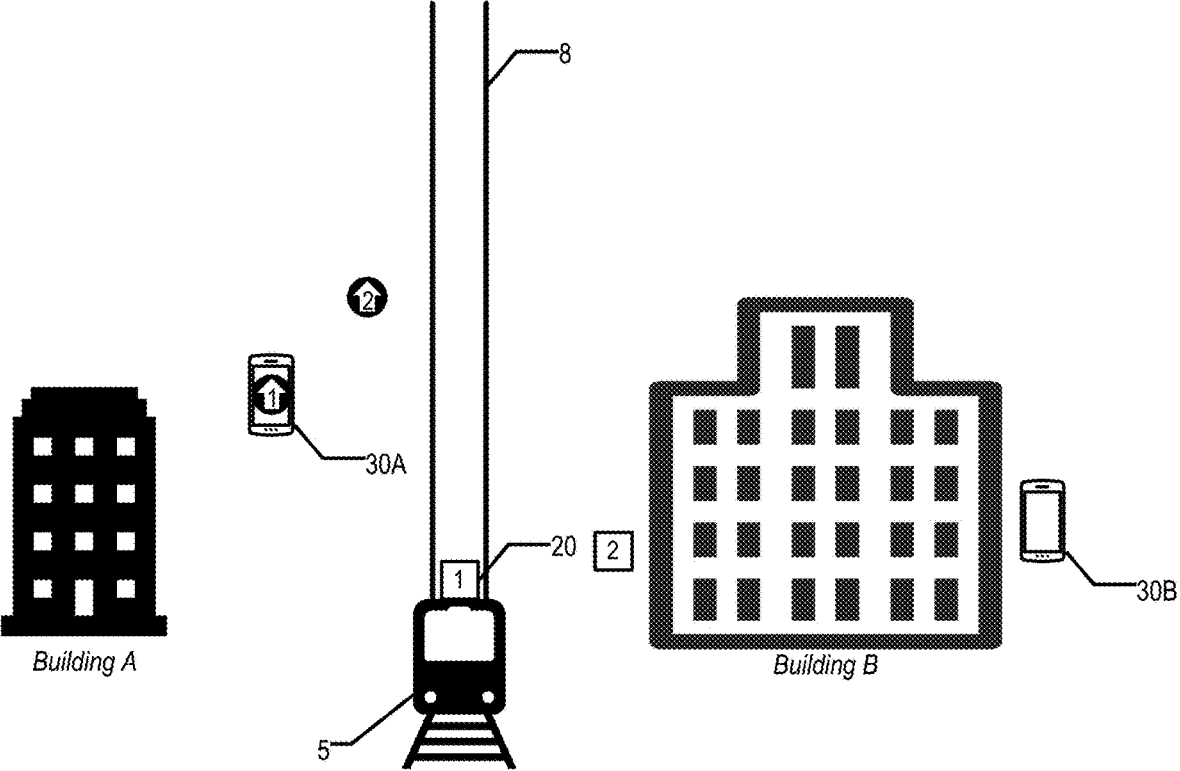

Having thus described certain example embodiments in general terms, reference will hereinafter be made to the accompanying drawings, which are not necessarily drawn to scale, and wherein:

FIG. 1 is a block diagram showing an example architecture of one exemplary embodiment;

FIG. 2A is a block diagram of a network apparatus that may be specifically configured in accordance with an example embodiment;

FIG. 2B is a block diagram of a constrained apparatus that may include a GNSS receiver and a plurality of sensors, and that may be specifically configured in accordance with an example embodiment;

FIG. 2C is a block diagram of a mobile apparatus that may be specifically configured in accordance with an example embodiment;

FIG. 3 is a flowchart illustrating an overview of operations performed, such as by the network apparatus of FIG. 2A, the constrained apparatus of FIG. 2B, or the mobile apparatus of FIG. 2C, in accordance with an example embodiment;

FIG. 4 is a flowchart illustrating operations performed, such as by the constrained apparatus of FIG. 2B, to provide GNSS receiver data, in accordance with an example embodiment;

FIG. 5 is a flowchart illustrating operations performed, such as by the mobile apparatus of FIG. 2C, to provide a route information/error characterization and use route information/error characterization to perform one or more navigation-related functions, in accordance with an example embodiment; and FIG. 6 is a block diagram showing an example architecture of the overview of operations performed, such as by the network apparatus of FIG. 2A, the constrained apparatus of FIG. 2B, and the mobile apparatus of FIG. 2C, where route information/error characterization may be used to perform one or more navigation-related functions in accordance with an example embodiment.

DETAILED DESCRIPTION

I. General Overview

Some embodiments will now be described more fully hereinafter with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Various embodiments provide methods, apparatuses, systems, computer program products, and/or the like for determining and providing positioning error characterization and/or using positioning error characterization to perform one or more positioning and/or navigation-related functions. For example, the error characterization may be used to mitigate issues and/or challenges raised by inaccurate position estimates and/or provide improved user experience. For example, use of the error characterization in performing a positioning and/or navigation-related function is configured to provide a more accurate result of the positioning and/or navigation-related function, in various embodiments.

In various embodiments, a constrained apparatus is disposed onboard a constrained vehicle. In various embodiments, a constrained vehicle is a vehicle configured to traverse a constrained route. For example, in various embodiments, the constrained vehicle is a train, tram, streetcar, cable car, and/or other vehicle configured to traverse a set of tracks, along a cable, dedicated lane, and/or other constrained route. In various embodiments, a GNSS receiver of the constrained apparatus captures GNSS receiver data during a time period while the constrained vehicle is traversing the constrained route. The GNSS receiver data is used to determine a GNSS-based position estimate that indicates an estimated location of the GNSS receiver during at least a portion of the time period.

An error characterization for the position estimate is determined based on the position estimate and an expected location of the GNSS receiver that is determined based on the constrained route. In various embodiments, the error characterization comprises an offset between the position estimate and the expected location of the GNSS receiver along the constrained route. For example, due to the constrained vehicle being located on the constrained route, the expected location of the constrained vehicle is on the constrained route. Therefore, if the position estimate indicates that the constrained vehicle is five meters west of the constrained route, it may be determined that the offset is five meters west. In an example embodiment, embodiment, the error characterization includes the GNSS-based position estimate of the constrained apparatus and/or GNSS receiver thereof, an error estimate, an uncertainty of the position estimate, a route-corrected position estimate (e.g., determined based on the position estimate and knowledge of the location of the constrained route), a time stamp, and/or the like. The error characterization is then used to cause a mobile device to perform a positioning or navigation-related function that accounts for the error characterization.

In various embodiments, a constrained apparatus that includes a GNSS receiver is onboard the constrained vehicle configured to traverse a constrained route. The constrained route may be along rails, such as those traversed by a tramcar or train, or more generally, a dedicated lane. The position of the GNSS receiver of the constrained apparatus, as indicated by a GNSS-based position estimate, can be obtained when the distance to at least 4 visible satellites and the time period when these distances where measured are known. This information is herein referred to as GNSS receiver data. When an apparatus (e.g., network apparatus, constrained apparatus, and/or mobile apparatus) has knowledge of the GNSS receiver data and can calculate the position of each satellite using the navigation data received from each satellite (or e.g. over a network connection as assistance data) it can calculate the GNSS-based position estimate. Conventionally, in such scenarios, the location of the constrained vehicle along the constrained route is assumed to be the same location as the GNSS based-position estimate.

In various embodiments, an error characterization comprises the error estimation taken from the error in the GNSS position calculation. The error in the GNSS position calculation may be calculated and expressed in various ways. In various embodiments, when determining an error characterization, it is assumed that the exact location of the constrained vehicle on which the constrained apparatus is disposed is unknown; therefore, the expected location may have some error in it. In various embodiments, it may be assumed that the determined position estimate is "close" to the entities true position location. For example, the calculated position is not on a different street or a different part of the city. In various embodiments, the error estimate is known in one direction and is confined to tracks or a street, instead of the true location being anywhere around the urban environment.

Various embodiments additionally include a reference receiver/GNSS receiver in the tram that may use other information to deduce the amount and direction of the error estimate at a given time. This can be, for example, knowing the constrained route and direction the constrained vehicle, such as the tram, is going using map matching to calculate an error estimate. The receiver, if equipped with sensors such as an IMU, can use heading information or the like to aid in calculation. It is possible also to use other positioning sources, such as Wi-Fi positioning, to estimate the error. The error estimates may be expressed in various ways depending on the method used to estimate the error. The error can be expressed as a distance in coordinates (dX, dY, dZ), or the estimation process can deduce errors to a specific GNSS measurement (e.g., that the pseudo-range for satellite S has an error of x meters). The information, again depending on the method used, may also be limited to knowing the error only partially. For example, the distance between the calculated distance and rails in the direction of the normal of the tracks.

In various embodiments, the error can be calculated constantly via a plurality of filtering techniques (e.g., an extended Kalman filter) or a plurality of advanced machine learning algorithms. These techniques and/or algorithms allow for previous information to be used in combination with new information to constantly deduce an estimate of the error.

In various embodiments, because the constrained vehicle must be on the constrained route, at least a partial error estimate of the direction and size of the error from GNSS receiver data can be calculated. This error estimation can be used to correct for some of the errors in the mobile phone GNSS calculation. This can be done for example on a measurement level or on a calculated GNSS position level. For example, one can estimate the error per GNSS signal from the constrained vehicle measurements and correct for each signal in the phone, or one can correct the calculated coordinate position of the phone with an error estimation from the constrained vehicle.

In various embodiments, error characterizations can be transmitted in various ways. For example, transmission can be done by implementing an adaption of a peer-to-peer cooperative positioning system, where nearby devices can "listen" to constrained vehicles, such as railway vehicles, to receive updates on errors in their approximate location. Error characterizations can also be implemented on a trusted server, where error characterizations of constrained vehicle receivers are grouped and processed together. From this server, devices can then request error characterization for their location.

In various embodiments, the use of collaborative positioning or cooperative positioning refers to methods where information is shared between users to enable faster and/or more accurate positioning. In cooperative GNSS positioning, the shared information can be for example Doppler information or decoded navigation data. One or two devices can also share location information between each other.

In various embodiments, the end user device has the possibility to use the error characterizations either directly, by removing the error characterization from their calculation, or indirectly by using the magnitude of the error to give indication of their own position estimate. For example, if the magnitude of the error suddenly increases, the device may be able to either give a warning indication to the user or switch to another positioning source, such as Wi-Fi. Also based on how large the estimated difference between the constrained vehicle and the device is, the error characterization can be utilized differently. For example, if the estimated distance is 2 meters, it is very likely that the two receivers are under the same conditions. However, if the estimated distance is a block away, the conditions might be quite different, and the error characterization should be used more as a guidance indicator.

In various scenarios, the process can be extended to include multiple reference receivers in different constrained vehicles, or also multiple receivers in each constrained vehicle. For example, there can be one receiver per constrained vehicle carriage. The information from a number of receivers can then be combined via e.g., a trusted server to estimate the error along the area the tracks move through.

It is commonly known that a standalone GNSS receiver does not work satisfactorily in urban areas, and it also has certain fundamental bottlenecks in its performance that make it non-ideal for GNSS-based positions estimates. For example, providing non-deal GNSS-based position estimated for mass market devices and their use cases. GNSS was originally aimed for outdoor (and continuous signal reception) uses only, hence the GNSS signals and the data link from the satellites to the receivers were not designed for weak signal conditions nor to the fastest possible time-to-first-fix (TTFF). Also, the fact that the GNSS satellites are far in the space (on Medium Earth Orbit, at altitude of 20,000 km) and solar-powered means that there are limited engineering effort that will be enough to overcome the physical limitations related to limited transmission power and to the radio propagation losses.

GNSS receivers use a calculated time period, containing a calculated time difference and/or calculated travel time, to capture the signals between satellite and receiver to determine its position. Unfortunately, the calculated time period contains several types of errors that will result in an error also in the position domain. For low-cost receivers, only a small part of these errors is corrected for and therefore the position accuracy is only 5-10 meters. For high-end geodetic receivers errors are corrected for and the accuracy can be as good as <1 cm. However, each satellite transmits its signals continuously with a specified transmission power. Before reaching the receiver, the signal loses its power due to, for example, the atmosphere it travels through, possible blockages, such as trees, and multipath.

More specifically, technical problems exit relating to determining reliable GNSS-based position estimates in urban environments. Particularly, when obtaining position estimates via low-cost receivers, such as mobile phones, accuracy suffers. Large buildings and infrastructure limit signal visibility, and reflective surfaces cause multipath issues. In various embodiments, an urban environment is a primary application environment for the methods, apparatuses, systems, computer program products, and/or the like presented in the present disclosure. In an urban environment, the technical problem is that the availability of GNSS signals is typically much lower than in open areas. In addition, buildings and other infrastructure that cause multipath effects, and the signals that travel through blockage such as trees or walls, losing power, affect the GNSS measurements, which in turn result in degraded performance of obtaining the GNSS-based position. Stand-alone GNSS, especially those in low-cost receivers such as mobile phones, are not able to solve these errors themselves.

The methods, apparatuses, systems, computer program products, and/or the like presented in the present disclosure propose a technical solution that eliminates the errors caused by the environment by utilizing reference receivers in constrained vehicles that run on rails and/or on certain constrained route. In various embodiments, trams and mobile phones are used as examples, but it is noted that the methods, apparatuses, systems, computer program products, and/or the like presented in the present disclosure may be used with any other combination of reference constrained vehicle that is on a certain constrained route and an end user device In various embodiments, the technical advantages of the proposed method include the end user device not needing to implement complicated software logic itself, such as 3D map matching to calculate environmental errors. The more demanding calculations of errors are performed in the constrained vehicle's GNSS receiver or a trusted server, instead of each device individually. The method can also deliver approximately real-time error information, and it is not affected by sudden changes in the environments such as building demolitions, like map model-based solutions are, since the GNSS receivers calculate the error characterizations based on the current situation and not on some preexisting knowledge of the surroundings. Furthermore, the disclosed method may utilize cooperative positioning which relies on one constant source, such as the constrained vehicle. Cooperative positioning only needs one-way communication, allowing for the GNSS receiver to perform calculations without using any information from other devices.

While various embodiments are described herein with respect to a GNSS-based position estimate, various embodiments, may correspond to providing and using error characterizations for other types of position estimates (e.g., radio-based position estimates, other forms of satellite-based position estimates, and/or the like).

II. Example System Architecture

FIG. 1 provides an illustration of an example system that can be used in conjunction with various embodiments of the present invention. As shown in FIG. 1, the system may include one or more network apparatuses 10, one or more constrained apparatuses 20 that are each disposed on a respective constrained vehicle 5 configured to traverse a respective constrained route (path or track) 8, one or more mobile apparatuses 30, one or more networks 40, and/or the like.

In various embodiments, a constrained apparatus 20 that includes a GNSS receiver is onboard a constrained vehicle configured to traverse a constrained route 8. For example, in various embodiments, the constrained vehicle is a train, tram, street car, cable car, and/or other vehicle configured to traverse a set of tracks, along a cable, a dedicated lane, and/or other constrained routes 8.

In various embodiments, the mobile apparatus 30 is in a vehicle navigation system, vehicle control system, a mobile computing device, and/or the like. For example, a mobile apparatus 30 may be in a vehicle navigation system mounted within and/or be onboard a vehicle 35 such as a motor vehicle, non-motor vehicle, automobile, car, scooter, truck, van, bus, motorcycle, bicycle, Segway, golf cart, and/or the like. In an example embodiment, the mobile apparatus 30 may be a vehicle control system configured to autonomously drive a vehicle 35, assist in control of a vehicle 35, monitor various aspects of the vehicle 35 (e.g., fault conditions, motor oil status, battery charge level, fuel tank fill level, and/or the like) and/or the like. In various embodiments, a mobile apparatus 30 configured to autonomously drive a vehicle 35 may perform multiple functions that are similar to those performed by a mobile apparatus 30 configured to be an ADAS (e.g., lane keeping, lane change assistance, maintaining a lane, merging, etc.). In some embodiments, a mobile apparatus 30 may be onboard a personal vehicle, commercial vehicle, public transportation vehicle, fleet vehicle, and/or other vehicle. In various embodiments, the mobile apparatus 30 may be a smartphone, tablet, personal digital assistant (PDA), personal computer, desktop computer, laptop, and/or other mobile computing device.

In an example embodiment, the network apparatus 10 is a server, group of servers, distributed computing system, and/or other computing system. For example, the network apparatus 10 may be in communication with a plurality of constrained apparatuses 20, one or more mobile apparatuses 30, and/or the like via one or more wired or wireless networks 40. While the network apparatus 10 is generally described herein as a single computing entity, in various embodiments, the functions described herein as being performed by the network apparatus 10 may be performed by one or more of multiple network apparatuses 10.

In an example embodiment, a network apparatus 10 may comprise components similar to those shown in the example network apparatus 10 diagrammed in FIG. 2A. In an example embodiment, the network apparatus 10 is configured to obtain, access, receive, and/or process GNSS receiver data captured by a constrained apparatus onboard a constrained vehicle 5 traversing at least a portion of a constrained route 8 during a time period; determine a GNSS-based position estimate that indicates an estimated location of the constrained apparatus 20; determine an error characterization corresponding to the GNSS-based position estimate and an expected location of the constrained apparatus and/or constrained vehicle, and/or use or cause the use of the error characterization to perform a positioning and/or navigation related function that is aware of the error characterization. For example, as shown in FIG. 2A, the network apparatus 10 may comprise a processor 12, memory 14, a user interface 18, a communication interface 16, and/or other components configured to perform various operations, procedures, functions or the like described herein. In at least some example embodiments, the memory 14 is non-transitory.

In an example embodiment, a constrained apparatus 20 is onboard a constrained vehicle 5. In an example embodiment, the constrained apparatus 20 is configured to provide error characterization and/or error data to correct for the error to a mobile device. In an example embodiment, the constrained apparatus 20 may be configured to autonomously drive a constrained vehicle 5 and/or assist in control of a constrained vehicle 5 (e.g., an ADAS) in accordance with error characterizations. In an example embodiment, the constrained apparatus 20 may be configured to gather, collect, capture, and/or the like instances of GNSS receiver data as the constrained vehicle 5 traverses at least a portion of a constrained route 8. In various embodiments, the constrained apparatus 20 is configured to use the GNSS receiver data to determine a position estimate of the GNSS receiver, constrained apparatus 20, and/or constrained vehicle 5; provide the position estimate and/or GNSS receiver data; capture sensor data that may be used to determine an expected location of the constrained vehicle 5 along the constrained route 8; determine an error characterization corresponding to a position estimate; provide the error characterization; and/or the like.

In an example embodiment, as shown in FIG. 2B, the constrained apparatus 20 may comprise a processor 22, memory 24, a communication interface 26, a GNSS receiver 27, a user interface 28, one or more sensors 29 (e.g., a location sensor such as a global navigation satellite system (GNSS) sensor and/or GNSS receiver 27; IMU sensors such as accelerators, gyroscopes, and/or other sensors that can be used to detect motion of the constrained apparatus 20; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras, and/or other components configured to perform various operations, procedures, functions or the like described herein. In at least some example embodiments, the memory 24 is non-transitory.

In an example embodiment, a mobile apparatus 30 is onboard a vehicle 35. In an example embodiment, the mobile apparatus 30 may be configured to provide positioning and/or navigation-related functions that account for the error characterization to a user (e.g., an operator of the vehicle 35). In an example embodiment, the mobile apparatus 30 may be configured to autonomously drive a vehicle 35 and/or assist in control of a vehicle 35 (e.g., an ADAS) in accordance with providing positioning and/or navigation-related functions that account for the error characterization. In an example embodiment, the mobile apparatus 30 may be configured to generate and provide error characterization requests, receive responses to error characterization requests, perform one or more navigation-related functions based on error characterizations provided in response to error characterization requests, and/or the like.

In an example embodiment, as shown in FIG. 2C, the mobile apparatus 30 may comprise a processor 32, memory 34, a communication interface 36, a user interface 38, one or more sensors 39 (e.g., a location sensor such as a GNSS sensor/receiver; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the mobile apparatus 30 to determine one or more features of the corresponding vehicle's 35 surroundings and/or monitor the vehicle's 35 operating parameters), and/or other components configured to perform various operations, procedures, functions or the like described herein. In at least some example embodiments, the memory 34 is non-transitory.

Each of the components of the system may be in electronic communication with, for example, one another over the same or different wireless or wired networks 40 including, for example, a wired or wireless Personal Area Network (PAN), Local Area Network (LAN), Metropolitan Area Network (MAN), Wide Area Network (WAN), 5G cellular network, and/or the like. In some embodiments, a network 40 may comprise the automotive cloud, digital transportation infrastructure (DTI), radio data system (RDS)/high definition (HD) radio or other digital radio system, and/or the like. For example, a constrained apparatus 20 may be in communication with a network apparatus 10 via the network 40. For example, a constrained apparatus 20 may communicate with the network apparatus 10 via a network 40, such as the Cloud. For example, the Cloud may be a computer network that provides shared computer processing resources and data to computers and other devices connected thereto. In various embodiments, a mobile apparatus 30 may communicate with the network apparatus 10 via a network, such as the Cloud.

Certain example embodiments of the network apparatus 10, constrained apparatus 20, and the mobile apparatus 30 are described in more detail below with respect to FIGS. 2A, 2B, and 2C.

III. Exemplary Operation of an Example Embodiment

Various embodiments provide methods, apparatuses, systems, computer program products, and/or the like for providing error characterization and/or using error characterizations to perform one or more navigation-related functions to mitigate the effects of error characterizations. In various embodiments, GNSS receiver data is used to identify route information and the route information is identified and/or extracted and then used to generate error characterizations. The error characterization comprises the offset between a position estimate and an expected location of the GNSS receiver on a constrained route 8. The error characterization is then used to cause a mobile device to perform a positioning or navigation-related function to account for the error characterization.

Various embodiments include instances of GNSS receiver data that may comprise a time stamp indicating the time that the instance of GNSS receiver data was gathered, collected, captured and/or the like. In an example, an instance of GNSS receiver data may comprise a position and/or heading corresponding to a location and/or heading of the constrained vehicle 5 and/or constrained apparatus 20 at the time the instance of GNSS receiver data was gathered, collected, captured, and/or the like. In an example embodiment, an instance of GNSS receiver data may comprise information/data identifying one or more localization objects observed when the constrained apparatus 20 and/or constrained vehicle 5 was located at the position and/or heading of the instance of GNSS receiver data, a distance between the constrained apparatus 20 and/or constrained vehicle 5 and at least one of the one or more localization objects when the constrained apparatus 20 and/or constrained vehicle 5 was located at the position and/or heading of the instance of GNSS receiver data, and/or the like. In an example embodiment, an instance of GNSS receiver data comprises a combination of a plurality of coordinates (X,Y,Z) that may be used to calculate a calculated GNSS-receiver position, as well as an error characterization.

In various embodiments, because the constrained vehicle must be on the constrained route, at least a partial error estimate of the direction and size of the error from GNSS-based position estimate can be calculated. This error estimation can be used to correct for some of the errors in the mobile phone GNSS calculation. This can be done for example on the measurement level or the calculated GNSS position level. For example, one can estimate the error per GNSS signal from the constrained vehicle measurements and correct for each signal in the phone, or one can correct the calculated coordinate position of the phone with an error estimation from the constrained vehicle. Where an error characterization is the error estimation taken from the error in the GNSS position calculation. The error in the GNSS position calculation may be calculated and expressed in various ways. In various embodiments, when determining an error characterization, it is assumed that the exact location of the constrained vehicle is unknown; therefore, the calculated position in the constrained vehicle receiver will have some error in it. This can be generally expressed as position estimate=true location+offset. Where offset refers to the error in the calculated position. If the exact location of the constrained vehicle was known, the reference receiver in the constrained vehicle could be used as a generic "reference station" and typical differential GNSS (DGNSS)/Real Time Kinematics (RTK) methods could be utilized. A calculated GNSS-receiver position, as well as an error estimate, is a combination of a plurality of coordinates (X,Y,Z) from the GNSS receiver data. In various embodiments, these coordinates of the calculated GNSS-receiver position and the error estimates may also contain velocities, headings and/or other values, but for simplification, we will herein refer to them as "coordinates". In various embodiments, it may be assumed that the calculated GNSS-receiver position is "close" to the entities true position location. For example, the calculated position is not on a different street or a different part of the city. In various embodiments, the error estimate is known in one direction and is confined to tracks or a street, instead of the true location being anywhere around the urban environment.

In various embodiments, the expected location refers to a location that is assumed to be the true location for the position estimate calculation purposes. The expected location is utilized in the position estimate calculations by being the closest point to the position estimate along the constrained route. Assuming the expected location is "close" to the true location (i.e., the GNSS-receiver position is not on a different street or in a different part of the city) confines the location of the true location of the GNSS receiver to tracks the constrained vehicle is traversing, not anywhere else around the area. The expected location is determined using motion sensors and/or the like.

Various embodiments additionally use the constrained apparatus aboard the constrained vehicle as a reference GNSS receiver, where the constrained apparatus may use other information to deduce the amount and direction of the error estimate at a given time. This can be, for example, knowing the constrained route and direction the constrained vehicle is going and then having the constrained apparatus use map matching to calculate an error estimate. The constrained apparatus, if equipped with sensors such as an IMU, can use heading information or the like to aid in calculation. It is also possible for the constrained apparatus to use other positioning sources, such as Wi-Fi positioning, to estimate the error. The error estimates may be expressed in various ways depending on the method used to estimate the error by the constrained apparatus. The error can be expressed as a distance in coordinates (dX, dY, dZ), or the estimation process can deduce errors to a specific GNSS measurement (e.g., that the pseudo-range for satellite S has an error of X meters). The information, again depending on the method used by the constrained apparatus, may also be limited to knowing the error only partially. For example, the distance between the calculated distance and rails in the direction of the normal of the tracks.

Various embodiments are directed to using error characterizations to cause routing and/or navigation-related functions. In various embodiments the error can be calculated constantly via a plurality of filtering techniques (e.g., an extended Kalman filter) or a plurality of advanced machine learning algorithms. In various embodiments, these techniques and/or algorithms allow for previous information to be used in combination with new information to constantly deduce an estimate of the error.

A. Exemplary Operation of a Network Apparatus

FIG. 3 provides a flowchart illustrating various processes, procedures, operations, and/or the like that may be performed by a network apparatus 10, for example, to provide error characterizations and use the error characterizations to update a digital map and/or otherwise perform one or more navigation-related functions based at least in part of a GNSS-based position estimate and/or expected location of a GNSS receiver on a constrained route.

In various embodiments, some or all of the processes, procedures, operations, and/or the like of FIG. 3 and described herein as being performed by the network apparatus 10 may be performed by the constrained apparatus 20 and/or a mobile apparatus 30. For example, in an example embodiment, the constrained apparatus 20 may communicate with one or more mobile apparatuses 30 without a network apparatus 10 acting as an intermediary.

Starting at step/operation 302, the network apparatus 10 obtains GNSS receiver data corresponding to constrained vehicles traversing a constrained route. For example, the network apparatus 10 comprises means, such as processor 12, memory 14, communications interface 16, user interface 18, and/or the like, for obtaining GNSS receiver data. In various embodiments, the GNSS receiver data is obtained by receiving the GNSS receiver data (e.g., via communications interface 16). In various embodiments, the GNSS receiver data is obtained by accessing the GNSS receiver data from memory 14.

In various embodiments, the obtained GNSS receiver data comprises a plurality of instances of GNSS receiver data captured and/or provided by a plurality of constrained apparatuses 20 and/or corresponding to a plurality of trajectories through respective portions of the traversable network. In various embodiments, an instance of GNSS receiver data comprises a respective timestamp, trajectory identifier, location information/data, speed of the constrained vehicle 5 at the date and/or time indicated by the timestamp, one or more other elements of the sensor information/data describing at least a portion of the environment surrounding the constrained vehicle 5 at the date and/or time indicated by the timestamp, and/or the like.

In various embodiments, the obtained GNSS receiver data comprises a plurality of instances of GNSS receiver data that correspond to a same trajectory of a respective constrained vehicle 5 traversing at least a portion of the traversable network. For example, the obtained GNSS receiver data may be organized into a plurality of time-ordered sequences of GNSS receiver data with each sequence corresponding to at least a portion of a trajectory of a respective constrained vehicle 5. For example, the obtained GNSS receiver data comprises a plurality of trajectories formed as time-ordered sequences of instances of GNSS receiver data.

At step/operation 304, the network apparatus 10 processes the obtained GNSS receiver data to identify GNSS-based position estimates. For example, the trajectories of the obtained GNSS receiver data may be processed to identify GNSS-based position estimates (e.g., performed and/or witnessed by the constrained apparatus 20 that generated the corresponding instances of GNSS receiver data). For example, the network apparatus 10 comprises means, such as processor 12, memory 14, and/or the like, for processing the obtained GNSS receiver data to identify instances of GNSS-based position estimates.

In various embodiments, the trajectories of the obtained GNSS receiver data are processed to identify GNSS-based position estimates. The identified GNSS-based position estimates are then processed to identify error characterizations corresponding to GNSS-based position estimates and expected locations of the GNSS receivers.

At step/operation 306, the network apparatus 10 determines an expected location(s) of the GNSS receivers from the obtained GNSS-based positions and/or GNSS receiver data. For example, information characterizing respective instances of GNSS-based positions are extracted from the GNSS receiver data. The expected location is utilized in the position estimate calculations by being the closest point to the position estimate along the constrained route. Assuming the expected location is "close" to the true location (i.e., the GNSS receiver position is not on a different street or in a different part of the city) confines the location of the true location of the GNSS receiver to the tracks the constrained vehicle is traversing, not anywhere else around the area. The expected location(s) of the GNSS receiver disposed aboard the constrained vehicle during the time period may be determined in part by referencing the closest point along the constrained route using motion sensors, referencing the particular position along the constrained route based on IMU measurements, referencing the feature observations/identifications captured by a radio interface coupled to the constrained vehicle, and/or the like.

At step/operation 308, the network apparatus 10 determines one or more error characterizations corresponding to GNSS-based position estimates and obtains information contextualizing respective GNSS-based position estimates and error characterizations. In various embodiments, the information corresponding to a GNSS-based position estimate that is extracted from corresponding instances of GNSS receiver data/location include one or more a time of day/week/month/year when the instance of GNSS receiver data/location occurred; when and/or where the instance of GNSS receiver data/location started; time duration of the instance of GNSS receiver data/location; length duration of the instance of GNSS receiver data/location; when and/or where the instance of GNSS receiver data/location was completed; and/or the like.

In various embodiments, information contextualizing respective GNSS-based position estimates and/or error characterizations is received, accessed (e.g., from memory 14), and/or otherwise obtained. In various embodiments, the information contextualizing a respective GNSS-based position estimates determined in part by at least one of (a) an IMU or (b) observations captured by a radio interface coupled to the constrained vehicle corresponding to the location and/or time of a respective GNSS receiver data. For example, the network apparatus 10 comprises means, such as processor 12, memory 14, communication interface 16, user interface 18, and/or the like, for obtaining information contextualizing respective GNSS-based position estimates (e.g., at least one of (a) an IMU or (b) observations captured by a radio interface coupled to the constrained vehicle corresponding to the location and/or time of a respective GNSS receiver data.). For example, for each of the identified respective GNSS-based position estimates, the network apparatus 10 determines GNSS receiver data corresponding to the respective GNSS-based position estimate. In an example embodiment, the GNSS receiver data may be detected when distance to at least 4 visible satellites and the time period when these distances where measured are known: specifically, for a constrained vehicle traversing a constrained route. For example, on a constrained vehicle traversing the constrained route, the location of the constrained vehicle is known to a certain degree, and the constrained vehicle error is confined in certain directions, which can be used as reference to eliminate in part errors caused by bad GNSS signal availability and multipath. This is done by accounting for error characterizations corresponding to the GNSS-based position estimate found using the GNSS recover aboard the constrained vehicle traversing the constrained route.

In various embodiments, the network apparatus 10 obtains the at least one of (a) an IMU or (b) observations captured by a radio interface coupled to the constrained vehicle corresponding to the location and/or time of a respective GNSS receiver data by accessing the data from memory 14. For example, error characterization information may be determined by other devices in close proximity, either directly via (a) a cooperative positioning type approach or (b) indirectly via a trusted server, to enhance their position by accessing the data from memory 14.

In various embodiments, data may be accessed indirectly from memory 14 to enhance positioning for calculating error characterizations. The error characterizations may be calculated constantly by using a machine learning trained model, such as performing constant calculations via some filtering techniques (e.g., an extended Kalman filter) or some advanced machine learning algorithms. This form of multipath detection allows for storage of previous data regarding GNSS-based positions to be used with new data on GNSS-based position to constantly deduce an error estimate and error characterization.

Additionally, as indicated by step/operations 310/312, the error characterizations are used to update a digital map corresponding to a geographical region including the respective GNSS receiver data such that the prediction may be as input to one or more navigation-related functions, used to provide to notifications and/or alerts to vehicles and/or vehicle operators/passengers traversing or in the vicinity of the corresponding constrained vehicle, and/or the like.

At step/operation 310/312, the network apparatus 10 may use the learned error characterizations in updating a digital map corresponding to a geographical region including the respective GNSS receiver data such that the prediction may be as input to one or more navigation-related functions, or the network apparatus may use the error characterizations in providing notifications and/or alerts to vehicles and/or vehicle operators/passengers traversing or in the vicinity of the corresponding constrained vehicle, and/or the like. For example, the network apparatus 10 comprises means, such as processor 12, memory 14, and/or the like, for using or causing use of the error characterizations.

At step/operation 310, the error characterization for the GNSS receiver location is used to update a digital map and at least a portion of the digital map is provided (e.g., transmitted) for receipt by one or more mobile apparatuses 30. For example, the network apparatus 10 may update a data record of a geographic database to include information/data corresponding to the error characterization for the GNSS receiver location. For example, the network apparatus 10 may comprise means, such as processor 12, memory 14, communications interface 16, and/or the like, for updating a digital map to include at least a portion of the error characterization for the GNSS receiver location and provide (e.g., transmit) at least the portion of the digital map comprising the at least a portion of the error characterization for the GNSS receiver location. For example, the geographic database may include or be updated to include a table or other data record that comprises error characterization information for one or more respective GNSS receiver locations.

In various embodiments, the network apparatus 10 provides the updated digital map and/or geographic database (or portion thereof) such that one or more mobile apparatuses 30 receive the updated digital map and/or geographic data (or portion thereof). In various embodiments, the network apparatus 10 stores the updated digital map and/or geographic database (or portion thereof) to memory 14.

At step/operation 312, the network apparatus 10 uses or causes the use of at least a portion of the error characterization information for the GNSS receiver locations included in the digital map to perform one or more navigation-related functions. For example, the network apparatus 10 comprises means, such as processor 12, memory 14, communications interface 16, and/or the like to perform or cause performance of one or more navigation-related functions that use at least a portion of the error characterization information for the GNSS receiver locations included in the digital map as input. Some non-limiting examples of positioning and/or navigation-related functions include providing a route (e.g., via a user interface), localization, position estimate determination, route determination, lane level route determination, operating a vehicle along a lane level route, route travel time determination, lane maintenance, route guidance, lane level route guidance, provision of traffic information/data, provision of lane level traffic information/data, vehicle trajectory determination and/or guidance, vehicle speed and/or handling control, route and/or maneuver visualization, adjust one or more settings for sensors 39 and/or one or more operational parameters of the vehicle based on the error characterization of the GNSS receiver location, and/or the like. For example, if a vehicle is traversing a constrained route where error characterizations are expected for the GNSS receiver location a notification may be provided to the vehicle (e.g., to the mobile apparatus 30 in the case of an autonomous vehicle 35) such that one or more operational parameters of the vehicle 35 are modified and/or adapted so as to reduce the error characterization. For example, the one or more operational parameters may include operation of one or more sensors (e.g., which sensors are given more weight in making determinations, sampling speed, sensor data processing algorithm, and/or the like), speed of the vehicle, following distance, and/or the like. For example, if a vehicle is traversing a constrained route where error characterizations are expected for the GNSS receiver location, a human perceivable notification may be provided to a human operator of the vehicle (e.g., via a user interface 38 of a mobile apparatus 30) to warn the human operator that error in the GNSS-based location estimate are likely to occur along a particular section of road, and/or the like.

B. Exemplary Operation of a Constrained Apparatus

In various embodiments, a constrained apparatus 20 is onboard a constrained vehicle 5 that is traversing at least a portion of a traversable network. In various embodiments, one GNSS receiver 27 and one or more sensors 29 are onboard the constrained vehicle 5 and are in communication with the constrained apparatus 20. In an example embodiment, the traversable network is represented by a digital map (e.g., possibly in the form of a geographic database). In various embodiments, the constrained apparatus 20 captures instances of GNSS receiver data via the one GNSS receiver 27 and the one or more sensors 29 as the constrained vehicle 5 traverses the at least a portion of the traversable network. In an example embodiment, the constrained apparatus 20 may capture instances of GNSS receiver data periodically based on time (e.g., every second, every ten seconds, every thirty seconds, every minute, and/or the like) and/or distance traveled (e.g., every meter, ten meters, fifty meters, hundred meters, 250 meters, and/or the like). The constrained apparatus 20 may be configured to provide one or more instances of GNSS receiver data via a network 40 such that a network apparatus 10 receives the one or more instances of GNSS receiver data.

FIG. 4 provides a flowchart illustrating operations performed, such as by the constrained apparatus 20 of FIG. 2B to provide one or more instances of GNSS receiver data. Starting at step/operation 402, an instance of GNSS receiver data is captured. For example, as the constrained vehicle 5 traverses at least a portion of the traversable network, one GNSS receiver 27 and one or more sensors 29 may capture sensor information/data and communicate the sensor information/data to the constrained apparatus 20. For example, the constrained apparatus 20 may capture sensor information/data. For example, the constrained apparatus 20 may comprise means, such as the processor 22, memory 24, GNSS receiver 27, sensors 29, and/or the like, for capturing and/or generating GNSS receiver data.

In various embodiments, an instance of GNSS receiver data comprises location information indicating where the instance of GNSS receiver data was captured and a time-stamp indicating when the instance of GNSS receiver data was captured. For example, in various embodiments, the constrained apparatus 20 determines location information/data indicating a location and/or heading or pose of the constrained vehicle 5 and/or the constrained apparatus 20 when the sensor information/data was captured and a time-stamp corresponding to the date and/or time at which the sensor information/data was captured. For example, the constrained apparatus 20 may determine location information/data for the constrained vehicle 5 and/or the constrained apparatus 20 based on GNSS information/data, IMU sensor information/data, visual odometry (e.g., based on one or more digital images), heading information, Wi-Fi positioning, and/or other localization techniques and/or a combination thereof. In various embodiments, the constrained apparatus 20 comprises and/or is communication with an apparatus comprising a clock such that the constrained apparatus 20 may determine a timestamp corresponding to the date and/or time at which the sensor information/data is captured.

At step/operation 404, the constrained apparatus 20 captures sensor information/data. For example, the constrained apparatus 20 comprises means, such as processor 22, memory 24, sensors 29, and/or the like, for capturing sensor information/data. In various embodiments, the sensor information/data describes at least a portion of the environment surrounding the constrained vehicle 5. For example, in various embodiments, the sensor information/data includes a description of the radio environment about the constrained apparatus 20. For example, the sensor information/data may identify one or more radio sources observed by the constrained apparatus 20 (e.g., Wi-Fi network access points, Bluetooth beacons, cellular network access points, and/or other radio nodes), parameters characterizing respective radio signals emitted by the observed radio sources (e.g., received signal strength, round-trip-time, and/or the like), and/or the like. For example, in various embodiments, the sensor information/data includes a description of one or more visual and/or physical features of the environment surrounding the constrained vehicle 5. For example, the sensor information/data may include one or more digital images, lidar point clouds, radar point clouds, ultrasonic information/data, electromagnetic information/data, thermal information/data, and/or the like. In an example embodiment, the sensor information/data characterizes the motion of the constrained vehicle 5. For example, the sensor information/data may include IMU data such as accelerometer data and/or gyroscope data, odometer data, barometric pressure data, magnetic field data, and/or the like.

At step/operation 406, the expected location of the constrained apparatus 20 along the constrained route 8 is determined based at least in part on knowledge of the constrained route and/or the sensor information/data. For example, the constrained apparatus 20 determined an expected location of the constrained apparatus 20 (and/or the constrained vehicle 5) along the constrained route 8 based at least in part on knowledge of the constrained route and/or the sensor information/data. For example, the constrained apparatus 20 comprises means, such as processor 22, memory 24, and/or the like, for determining the expected location of the constrained apparatus 20 along the constrained route 8 based at least in part on the sensor information/data.

For example, in an example embodiment, the expected location of the constrained apparatus 20 is determined based on a radio-based position estimate of the constrained apparatus 20 (e.g., determined based on the observed radio environment about the constrained vehicle 5 and a radio map characterizing the expected radio environment in a geographic area) that is informed by the fact that the constrained apparatus 20 is located at a point along the constrained route 8. In an example embodiment, a distance along the constrained route 8 that the constrained vehicle 5 has traveled from a particular landmark (e.g., since leaving a train station, since passing a switch, since passing a near field communication, radio frequency identifier (RFID) transceiver, radio node operating as a radio beacon, and/or the like) is determined based at least in part on the sensor information/data and used to determine an expected location of the constrained apparatus 20 along the constrained route 8. In an example embodiment, visual odometry is used to determine the expected location of the constrained apparatus 20 along the constrained route 8. In an example embodiment, matching of visual and/or physical features identified in the sensor information/data to respective features of a feature map of the geographic area is used to determine the expected location of the constrained apparatus 20 along the constrained route 8.

At step/operation 408, the instance of GNSS receiver data, and possibly the expected location of the constrained apparatus 20 along the constrained route 8, is provided. For example, the constrained apparatus 20 may provide the instance of GNSS receiver data such that a network apparatus 10 receives the instance of GNSS receiver data. For example, the constrained apparatus 20 may comprise means, such as processor 22, memory 24, communications interface 26, and/or the like, for providing an instance of GNSS receiver data (and possibly the expected location) such that the network apparatus 10 receives the instance of GNSS receiver data (and the expected location). For example, the constrained apparatus 20 may repeatedly, such as regularly and/or periodically (e.g., based on a time and/or travel distance trigger), provide one or more instances of GNSS receiver data.

In various embodiments, the constrained apparatus 20 provides a sequence of instances of GNSS receiver data corresponding to a trajectory of the constrained apparatus 20 through at least a portion of the traversable network. In various embodiments, the trajectory of the constrained apparatus 20 includes one or more GNSS-based position estimates. In various embodiments, the instances of GNSS receiver data may comprise an indication of an identified error characterization (e.g., based on a change in GNSS-based position estimates and the GNSS receiver location of the constrained apparatus 20 along the constrained route).

In various embodiments, a network apparatus 10 is configured to receive and/or obtain instances of GNSS receiver data generated by one or more constrained apparatuses 20, detect and/or identify error characterization information for the GNSS receiver locations in trajectories corresponding to the instances of GNSS receiver data, detect and/or identify error characterization information for the GNSS receiver locations in the trajectories corresponding to the instances of GNSS receiver data that are error characterization changes, and/or the like.

C. Exemplary Operation of a Mobile Computing Entity

In various embodiments, a mobile apparatus 30 onboard a vehicle 35 generates an error characterization request. The error characterization request refers to, in direct cases, peer-to-peer cooperative positioning, where the nearby mobile apparatus 30 can "listen" to the constrained apparatus 20 aboard the constrained vehicle 5 to receive updates on the error characterization of their approximate location. Error characterization requests may also be utilized indirectly by implementing error estimates for the constrained apparatus 20 to a trusted server where they are grouped and processed together. The mobile apparatus 30 can then request error characterization information from the server for their approximate location. In an example embodiment, a user of the mobile apparatus 30 provides input to the mobile apparatus 30 via a user interface 38 of the mobile apparatus 30 that triggers the generation of the error characterization request. In an example embodiment, the mobile apparatus 30 may automatically generate the error characterization request in response to one or more triggers. For example, if the mobile apparatus 30 determines that the mobile apparatus 30 is in motion, the mobile apparatus 30 may automatically generate the error characterization request. In various embodiments, the error characterization request includes error characterization information/data such as a route (e.g., from an origin to a destination), traffic information/data, and/or the like. In an example embodiment, the error characterization request includes an origin location, a destination location, a current location of the mobile apparatus 30, and/or the like.

FIG. 5 provides a flowchart illustrating operations performed, such as by the mobile apparatus 30 to generate and provide an error characterization request and to use a response thereto to perform a navigation-related function, in accordance with an example embodiment. Starting at step/operation 502, a mobile apparatus 30 generates and provides an error characterization request. For example, in response to user input received via user interface 38 and/or in response to an automated trigger, the mobile apparatus 30 generates and provides error characterization information/data request. In various embodiments, the error characterization requests include information/data such as an error estimate (e.g., coordinates of the calculated GNSS-receiver position that may also contain velocities, headings and/or other values) that may provide positioning or navigation-related functions that account for the error characterization. In various embodiments, it may be assumed that the calculated GNSS-receiver position is "close" to the entities true position location. For example, the calculated position is not on a different street or a different part of the city. In various embodiments, the error estimate is known in one direction and is confined to tracks or a street, instead of the true location being anywhere around the urban environment. In an example embodiment, the error characterization information/data request includes an origin location, a destination location, a current location of the mobile apparatus 30, and/or the like. In various embodiments, the mobile apparatus 30 provides the request such that the network apparatus 10 receives the request.

At step/operation 504, the mobile apparatus 30 receives a response to the error characterization information/data request including the error characterization for at least one time of the time period the constrained vehicle is traversing the constrained route. For example, the mobile apparatus 30 may comprise means, such as processor 32, memory 34, communication interface 36, and/or the like for receiving a response to the error characterization request comprising error characterization information/data. For example, a network apparatus 10 may provide a response to the error characterization request comprising error characterization information/data such that the mobile apparatus 30 receives the response comprising the error characterization information/data and/or at least a portion of a digital map including error characterization for at least one GNSS receiver of the constrained route and/or digital map and/or provided by the response to the error characterization request. In various embodiments, the error characterization request may include a route, information/data indicating a route, error characterization information/data, and error estimate (e.g., coordinates of the calculated GNSS-receiver position that may also contain velocities, headings and/or other values), and/or the like.

At step/operation 506, the mobile apparatus 30 may use at least a portion of the error characterization information/data to perform one or more navigation-related functions. For example, the mobile apparatus 30 may use the error characterization information/data to perform one or more navigation-related functions. For example, the mobile apparatus 30 may comprise means, such as processor 32, memory 34, communication interface 36, user interface 38, and/or the like, for using the error characterization information/data to perform one or more navigation-related functions. Some non-limiting examples of positioning and/or navigation-related functions include localization, route determination, position estimate determination, lane level route determination, operating a vehicle along a lane level route, route travel time determination, lane maintenance, route guidance, lane level route guidance, provision of traffic information/data, provision of accident rate in respective condition, provision of lane level traffic information/data, vehicle trajectory determination and/or guidance, vehicle speed and/or handling control, route and/or maneuver visualization, provision of safety alerts, and/or the like.

For example, if a vehicle is traversing a route where error characterizations are expected for the GNSS receiver location a notification may be provided to the vehicle (e.g., to the mobile apparatus 30 in the case of an autonomous vehicle 35) such that one or more operational parameters of the vehicle 35 are modified and/or adapted so as to reduce the error characterization. For example, the one or more operational parameters may include operation of one or more sensors (e.g., which sensors are given more weight in making determinations, sampling speed, sensor data processing algorithm, and/or the like), speed of the vehicle, following distance, and/or the like. For example, if a vehicle is traversing a route where error characterizations are expected for the GNSS receiver location, a human perceivable notification may be provided to a human operator of the vehicle (e.g., via a user interface 38 of a mobile apparatus 30) to warn the human operator that error in the GNSS-based location estimate are likely to occur along a particular section of road, and/or the like.

D. Exemplary Embodiment of Combined Operations

In various embodiments, the network apparatus 10 and/or constrained apparatus 20 may be onboard a constrained vehicle 5 traversing a constrained route in at least a portion of a traversable network, and/or in communication with a mobile apparatus 30, possibly onboard a vehicle 35 traversing at least a portion of the traversable network.

FIG. 6 provides an example use of the methods disclosed. FIG. 6 illustrates generic traffic on an urban street, where two buildings, Building A and Building B are on either side of a constrained vehicle 5 which is traversing at least a portion of a traversable network on a constrained route. In some embodiments, constrained vehicle 5 may use a vehicle on static rails (such as a tram) and/or constrained vehicle 5 may be a constrained route (such as rails) whilst moving. In some embodiments, a constrained apparatus 20 is aboard the constrained vehicle 5 on a certain constrained route. A mobile apparatus 30 is presented as a mobile apparatus 30A and a mobile apparatus 30B, which represents a user's personal navigation device on the sidewalk between Building A and Building B or on the other side of Building B, respectively.

In various embodiments, mobile apparatus 30A that is between two buildings may use error characterizations from the constrained apparatus 20 on constrained vehicle 5 to determine a true location for the apparatuses. Symbols represented with 1s (squares for constrained vehicle 5, arrows for mobile apparatus 30A) describe the true location of the apparatuses, and symbols represented with 2s represent the calculated GNSS position. Building A is a one-story building (i.e., a higher number of GNSS signals over Building A are still visible); whereas, Building B is a higher story building, which means that most of the satellites on the right side of the constrained vehicle are being blocked and lower numbers of GNSS signals are visible. The sides of the buildings each also reflect some GNSS signals resulting in multipath. The signal difference between the calculated GNSS positions and the true locations can be found using the simplified expression position estimate=true location+offset. Where Offset refers to the error characterization found from the GNSS-based position.

In some embodiments, a mobile apparatus 30B may be present on the opposite side of Building B with respect to the constrained route 8. Since Building B is a higher story building, Building B may obstruct various satellite signals such that, even though mobile apparatus 30A and mobile apparatus 30B are relatively close to one another, the satellite signals observed by mobile apparatus 30A and the mobile apparatus 30B may be significantly different. Thus, the ways in which the mobile apparatus 30A and mobile apparatus 30B use the error characterization may differ. For example, mobile apparatus 30B may make indirect use of error characterizations, by using the magnitude of the error specific to a satellite to give indication of their own position estimate while mobile apparatus 30A may make direct use of the offset provided by the error characterization by removing the error characterization from its calculations. Thus, how and/or which portion of the error characterization is used to perform a positioning and/or navigation-related function may be determined based on the distance of a mobile apparatus 30 from the location corresponding to the error characterization (e.g., the expected location or the position estimate used to determine the error characterization), a building or other obstacles located proximate the constrained route (e.g., as determined based on a two-dimensional or three-dimensional model of the geographic area where the constrained route is located), and/or the like.

E. Technical Advantages

The technical problem in receiving reliable GNSS-based position estimates is attributed in part to urban environments. Particularly, when obtaining position estimates via low-cost receivers, such as mobile phones, accuracy suffers. Large buildings and infrastructure limit signal visibility, and reflective surfaces cause multipath issues. In various embodiments, an urban environment is a primary application environment for the methods, apparatuses, systems, computer program products, and/or the like presented in the present disclosure. In an urban environment, the technical problem is that the availability of GNSS signals is typically much lower than in open areas. In addition, buildings and other infrastructure that cause multipath effects, and the signals that travel through blockage such as trees or walls, losing power, affect the GNSS measurements, which in turn result in degraded performance of obtaining the GNSS-based position. Stand-alone GNSS, especially those in low-cost receivers such as mobile phones, are not able to solve these errors themselves.

The methods, apparatuses, systems, computer program products, and/or the like presented in the present disclosure propose a technical solution that eliminates the errors caused by the environment by utilizing reference receivers in constrained vehicles that run on rails and/or on certain constrained route. In various embodiments, trams and mobile phones are used as examples, but it is noted that the methods, apparatuses, systems, computer program products, and/or the like presented in the present disclosure may be used with any other combination of reference constrained vehicle that is on a certain constrained route and an end user device In various embodiments, the technical advantages of the proposed method include the end user device not needing to implement complicated software logic itself, such as 3D map matching to calculate environmental errors. The more demanding calculations of errors are performed in the constrained vehicle's GNSS receiver or a trusted server, instead of each device individually. The method can also deliver approximately real-time error information, and it is not affected by sudden changes in the environments such as building demolitions, like map model-based solutions are, since the GNSS receivers calculate the error estimates based on the current situation and not on some pre-existing knowledge of the surroundings. Furthermore, the disclosed method may utilize cooperative positioning which relies on one constant source, such as the constrained vehicle. Cooperative positioning only needs one-way communication, allowing for the GNSS receiver to perform calculations without using any information from other devices.

IV. Example Apparatus

The network apparatus 10, constrained apparatus 20, and/or mobile apparatus 30 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display.

Additionally, or alternatively, the network apparatus 10, constrained apparatus 20, and/or mobile apparatus 30 may be embodied in other types of computing devices, such as a server, a personal computer, a computer workstation, a laptop computer, a plurality of networked computing devices or the like, that are configured to update one or more map tiles, analyze instances of GNSS receiver data for route planning or other purposes. In an example embodiment, a constrained apparatus 20 is an in-vehicle navigation system onboard a constrained vehicle 5 or a mobile device; a network apparatus 10 is a server; and a mobile apparatus 30 is a navigation system and/or device, and/or the like.

In this regard, FIG. 2A depicts an example network apparatus 10, FIG. 2B depicts an example constrained apparatus 20, and FIG. 2C depicts an example mobile apparatus 30 that may be embodied by various computing devices including those identified above. As shown, the network apparatus 10 of an example embodiment may include, may be associated with, or may otherwise be in communication with a processor 12 and a memory device 14 and optionally a communication interface 16 and/or a user interface 18. Similarly, a constrained apparatus 20 of an example embodiment may include, may be associated with, or may otherwise be in communication with a processor 22, a memory device 24, a communication interface 26, a user interface 28, GNSS receiver 27, one or more sensors 29 (e.g., a location sensor such as a GNSS sensor/receiver 27, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the constrained apparatus 20 to determine one or more features of the corresponding constrained vehicle's 5 surroundings), and/or other components configured to perform various operations, procedures, functions, or the like described herein. Similarly, a mobile apparatus 30 of an example embodiment may include, may be associated with, or may otherwise be in communication with a processor 32, a memory device 34, a communication interface 36, a user interface 38, one or more sensors 39 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the constrained apparatus 20 to determine one or more features of the corresponding vehicle's 35 surroundings), and/or other components configured to perform various operations, procedures, functions, or the like described herein.

In some embodiments, the processor 12, 22, 32 (and/or co-processors or any other processing circuitry assisting or otherwise associated with the processor) may be in communication with the memory device 14, 24, 34 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the network apparatus 10, constrained apparatus 20, and/or mobile apparatus 30 may be embodied by a computing device. However, in some embodiments, a respective apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22, 32 may be embodied in a number of different ways. For example, the processor 12, 22, 32 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22, 32 may include one or more processing cores configured to perform independently. A multi-core processor may enable multiprocessing within a single physical package. Additionally or alternatively, the processor 12, 22, 32 may include one or more processors configured in tandem via the bus to enable independent execution of instructions, pipelining and/or multithreading.

In an example embodiment, the processor 12, 22, 32 may be configured to execute instructions stored in the memory device 14, 24, 34 or otherwise accessible to the processor. For example, the processor 22 may be configured to execute computer-executable instructions embedded within a link record of a map tile and/or provided as part of a conflict-resolved travel plan. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the network apparatus 10, constrained apparatus 20, and/or mobile apparatus 30 may include a user interface 18, 28, 38 that may, in turn, be in communication with the processor 12, 22, 32 to provide output to the user, such as one or more potential DFC corridors and the corresponding rankings, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22, 32 (e.g., memory device 14, 24, 34, and/or the like).

The network apparatus 10, constrained apparatus 20, and/or mobile apparatus 30 may optionally include a communication interface 16, 26, 36. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the network apparatus 10, constrained apparatus 20, mobile apparatus 30 of an example embodiment, a navigation system may also include or have access to a geographic database that includes a variety of data (e.g., map information/data, at least a portion of a digital map representing at least a portion of the traversable network) utilized in constructing a route or navigation path, determining the time to traverse the route or navigation path, matching a geolocation (e.g., a GNSS determined location) to a point on a map, error characterization, and/or the like. For example, a geographic database may include a GNSS receiver information/data derived and/or determined based on one or more error characterizations, GNSS-based position estimates, point of interest (POI) data records and other data records. Moreover, fewer or different data records can be provided. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example.

In an example embodiment, the network apparatus 10 may be configured to modify, update, and/or the like one or more data records of the geographic database. For example, the network apparatus 10 may modify, update, and/or the like the digital map to include error characterization information/data derived and/or determined based on one or more GNSS-based position estimated and/or the corresponding data records, and/or the like.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicles along roads throughout the geographic region to observe features and/or record information about them, for example. Also, remote sensing, such as aerial or satellite photography, can be used. In an example embodiment, the geographic database (e.g., the digital map provided error characterizations for GNSS receiver location) may be generated and/or updated based on information/data provided by a plurality of non-dedicated constrained apparatuses. For example, the constrained apparatuses may be onboard vehicles owned and/or operated by and/or on behalf of members of the general public such that, for example, new drives certain constrained routes or roads are used to generate and/or update the digital map provided error characterizations for GNSS receiver location may be crowdsourced.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a network apparatus 10, constrained apparatus 20, and/or mobile apparatus 30 in accordance with an example embodiment may determine the time to traverse a route that includes one or more turns at respective intersections more accurately.

V. Apparatus, Methods, and Computer Program Products

As described above, FIGS. 3, 4, and 5 illustrate flowcharts of a present embodiment of FIG. 1, network apparatus 10, constrained apparatus 20, mobile apparatus 30, and/or methods and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24, 34 of an apparatus employing an embodiment of the present invention and executed by the processor 12, 22, 32 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computer-implemented method comprising:

capturing GNSS receiver data during a time period by a GNSS receiver disposed onboard a constrained vehicle, wherein the constrained vehicle is configured to traverse a constrained route;

determining, by one or more processors, a GNSS-based position estimate indicating an estimated location of the GNSS receiver during at least a portion of the time period, the GNSS-based position estimate determined based at least in part on the GNSS receiver data;

determining, by the one or more processors, an error characterization corresponding to an offset between the position estimate and an expected location of the GNSS receiver along the constrained route;

causing, by one or more processors, a mobile device to perform a positioning or navigation-related function that accounts for the error characterization, wherein the error characterization comprising the offset between the position estimate and the expected location of the GNSS receiver further comprises a multi-dimensional displacement between the position estimate and the expected location of the GNSS receiver disposed aboard the constrained vehicle along the constrained route during the time period, and wherein the expected location of the GNSS receiver disposed aboard the constrained vehicle along the constrained route during the time period is determined based at least in part on at least one of (a) an inertial measurement unit (IMU) or (b) observations captured by a radio interface coupled to the constrained vehicle; and further wherein the expected location of the GNSS receiver disposed aboard the constrained vehicle along the constrained route during the time period is determined indirectly via a trusted server.

2. The method of claim 1, wherein the error characterization comprising the offset between the position estimate and the expected location of the GNSS receiver further comprises the position estimate from the constrained route.

3. The method of claim 1, wherein the error characterization comprises an error estimate for each GNSS satellite observed by the GNSS receiver.

4. The method of claim 1, wherein causing the mobile device to perform a positioning or navigation-related function that accounts for the error characterization comprises at least one of (a) broadcasting the error characterization, (b) providing the error characterization in response to a received request, or (c) incorporating or causing the incorporating of the error characterization into a digital map or geographic database.

5. The method of claim 1, wherein the mobile device performs the positioning or navigation-related function that accounts for the error characterization by at least one of (a)

correcting a GNSS-based mobile device position estimate based on the error characterization, (b) correcting one or more observed GNSS signals based on the error characterization, or (c) determining a position of the mobile device using a non-GNSS-based positioning technique.

6. The method of claim 1, wherein the error characterization comprises at least one of a velocity error estimate or a heading error estimate.

7. The method of claim 1, wherein the constrained route is constrained by one of (a) rails along which the constrained vehicle travels or (b) dedicated travel lanes along which the constrained vehicle travels.

8. The method of claim 1, wherein ground truth positions of one or more points along the constrained route are known and the error characterization is determined based at least in part on at least one of the ground truth positions.

9. An apparatus comprising at least one processor and at least one non-transitory memory including computer program code instructions, the computer program code instructions configured to, when executed, cause the apparatus to at least:

capture GNSS receiver data during a time period by a GNSS receiver disposed onboard a constrained vehicle, wherein the constrained vehicle is configured to traverse a constrained route;

determine, by one or more processors, a GNSS-based position estimate indicating an estimated location of the GNSS receiver during at least a portion of the time period, the GNSS-based position estimate determined based at least in part on the GNSS receiver data;

determine, by the one or more processors, an error characterization corresponding to an offset between the position estimate and an expected location of the GNSS receiver along the constrained route;

cause, by one or more processors, a mobile device to perform a positioning or navigation-related function that accounts for the error characterization, wherein the error characterization comprising the offset between the position estimate and the expected location of the GNSS receiver further comprises a multi-dimensional displacement between the position estimate and the expected location of the GNSS receiver disposed aboard the constrained vehicle along the constrained route during the time period, and wherein the expected location of the GNSS receiver disposed aboard the constrained vehicle along the constrained route during the time period is determined based at least in part on at least one of (a) an inertial measurement unit (IMU) or (b) observations captured by a radio interface coupled to the constrained vehicle; and further wherein the expected location of the GNSS receiver disposed aboard the constrained vehicle along the constrained route during the time period is determined indirectly via a trusted server.

10. The apparatus of claim 9, wherein the error characterization comprising the offset between the position estimate and the expected location of the GNSS receiver further comprises the position estimate from the constrained route.

11. The apparatus of claim 9, wherein the error characterization comprises an error estimate for each GNSS satellite observed by the GNSS receiver.

12. The apparatus of claim 9, wherein causing the mobile device to perform a positioning or navigation-related function that accounts for the error characterization comprises at least one of (a) broadcasting the error characterization, (b) providing the error characterization in response to a received request, or (c) incorporating or causing the incorporating of the error characterization into a digital map or geographic database.

13. The apparatus of claim 9, wherein the mobile device performs the positioning or navigation-related function that accounts for the error characterization by at least one of (a) correcting a GNSS-based mobile device position estimate based on the error characterization, (b) correcting one or more observed GNSS signals based on the error characterization, or (c) determining a position of the mobile device using a non-GNSS-based positioning technique.

14. The apparatus of claim 9, wherein the error characterization comprises at least one of a velocity error estimate or a heading error estimate.

15. The apparatus of claim 9, wherein the constrained route is constrained by one of (a) rails along which the constrained vehicle travels or (b) dedicated travel lanes along which the constrained vehicle travels.

16. A computer program product comprising at least one non-transitory computer-readable storage medium having computer-executable program code instructions stored therein, the computer-executable program code instructions comprising program code instructions to:

capture GNSS receiver data during a time period by a GNSS receiver disposed onboard a constrained vehicle, wherein the constrained vehicle is configured to traverse a constrained route;

determine, by one or more processors, a GNSS-based position estimate indicating an estimated location of the GNSS receiver during at least a portion of the time period, the GNSS-based position estimate determined based at least in part on the GNSS receiver data;

determine, by the one or more processors, an error characterization corresponding to an offset between the position estimate and an expected location of the GNSS receiver along the constrained route;

cause, by one or more processors, a mobile device to perform a positioning or navigation-related function that accounts for the error characterization, wherein the error characterization comprising the offset between the position estimate and the expected location of the GNSS receiver further comprises a multi-dimensional displacement between the position estimate and the expected location of the GNSS receiver disposed aboard the constrained vehicle along the constrained route during the time period, and wherein the expected location of the GNSS receiver disposed aboard the constrained vehicle along the constrained route during the time period is determined based at least in part on at least one of (a) an inertial measurement unit (IMU) or (b) observations captured by a radio interface coupled to the constrained vehicle; and further wherein the expected location of the GNSS receiver disposed aboard the constrained vehicle along the constrained route during the time period is determined indirectly via a trusted server.

* * * * *